(12) United States Patent
Famme

(10) Patent No.: US 7,572,636 B2
(45) Date of Patent: Aug. 11, 2009

(54) METHOD OF DETECTING A LEAKAGE IN AN APPARATUS

(75) Inventor: Per Famme, Odense C (DK)

(73) Assignee: APV Solutions & Services A/S, Silkeborg (DK)

( * ) Notice: Subject to any disclaimer, the term of this patent is extended or adjusted under 35 U.S.C. 154(b) by 738 days.

(21) Appl. No.: 10/499,380

(22) PCT Filed: Dec. 17, 2002

(86) PCT No.: PCT/DK02/00866

§ 371 (c)(1),
(2), (4) Date: Oct. 12, 2004

(87) PCT Pub. No.: WO03/051131

PCT Pub. Date: Jun. 26, 2003

(65) Prior Publication Data

US 2005/0042757 A1 Feb. 24, 2005

(30) Foreign Application Priority Data

Dec. 17, 2001 (DK) ................. 2001 01890

(51) Int. Cl.
*G01N 31/00* (2006.01)
(52) U.S. Cl. .......................... 436/3; 436/127
(58) Field of Classification Search .............. 436/3
See application file for complete search history.

(56) References Cited

U.S. PATENT DOCUMENTS

| 3,790,345 A | 2/1974 | Mansfield et al. |
| 4,226,640 A | 10/1980 | Bertholdt |
| 4,328,700 A | 5/1982 | Fries |
| 4,515,641 A | 5/1985 | Juenger |
| 4,586,523 A | 5/1986 | Juenger |
| 4,688,627 A | 8/1987 | Jean-Luc et al. |
| 5,170,840 A | 12/1992 | Grunwald |
| 5,759,857 A | 6/1998 | Goyal et al. |

FOREIGN PATENT DOCUMENTS

| DK | 155627 B | 12/1983 |
| EP | 0 597 659 A2 | 5/1994 |
| GB | 2 070 580 A | 9/1981 |
| WO | WO02/079746 A1 * | 10/2002 |

OTHER PUBLICATIONS

"H2O2 Rockets", http://www.tecaeromex.com/ingles/peroxidoi.html, 2006.*
Standard Methods of Chemical Analysis: A Manual of Analytical Methods and . . . By Wilfred Welday Scott Published 1922 D. Van Nostrand Company Chemistry, Analytic Original from the New York Public Library v. 2 Digitized Jun. 22, 2006, pp. 1539 and 1540.*
Nitikin et al., *Heat Transfer Research*, 28, 215-225 (1997) (Abstract).
Dowman et al., *International Journal of Dairy Technology*, 53 (1), 13-20 (2000).

* cited by examiner

*Primary Examiner*—Yelena G Gakh
(74) *Attorney, Agent, or Firm*—Baker & Hostetler LLP

(57) ABSTRACT

The invention relates to a method of determining the cleanness of an apparatus comprising the steps of treating the interior of the apparatus with a solution comprising permanganate so as to cause the permanganate to react with contaminants, if any, being present within the apparatus, rinsing the interior of the apparatus to remove non-reacted permanganate, contacting the interior of the apparatus with a solution comprising peroxide and detecting a splitting, if any, of peroxide into oxygen and water. The invention also relates to a method of detecting a leakage in an apparatus and to a use of the method for determining the cleanness of an apparatus and for detecting a leakage in an apparatus.

14 Claims, 2 Drawing Sheets

METHOD OF DETECTING A LEAKAGE IN AN APPARATUS

FIELD OF THE INVENTION

The invention relates to a method of determining the cleanness of an apparatus and to the use of said method for determining the cleanness of an apparatus. The invention further relates to a method of detecting a leakage in an apparatus and to the use of said method for detecting a leakage in an apparatus.

BACKGROUND OF THE INVENTION

In the use of apparatuses, e.g. heat exchangers, valves, pumps, mixers or drying apparatuses for processing liquid substances, it is of utmost importance for optimum function of the apparatuses that the liquids are totally separated from the external parts of the apparatuses, so that contaminants are not transferred from the product side to the external side and vice versa, which might cause cross-contamination of the liquid substances and the external parts of the apparatus. It is likewise of utmost importance that the product side is completely purified at the beginning of the production, so that a product contacting the surfaces is not contaminated by contaminants from the preceding production.

Contact between the liquids at the product side and external side is mainly caused by leaks—holes, cracks and the like in the material separating the internal and the external side of the apparatuses. By way of example in a heat exchanger, it will be readily understood the internal side may be the product side and the external side may be the service medium compartment. In other words the exterior of the apparatus can also be an enclosed space which can be under pressure if desired. These leaks may be generated during the actual manufacture of the apparatus, during the mounting/assembly of the apparatus and during operation of the apparatus because of stresses and corrosion.

In the previous practice of checking leak in process equipment and apparatuses the leak control has been carried out by pressure testing, conductivity measurement, gas detection and specific mass transfer measurement on the total, operable apparatus (ref.: "A study of methods evaluating the integrity of plate heat exchangers used in the diary industry", Int. J. of Dairy Technology, Vol. 53, No. 1, February 2000).

Leak control by pressure testing is performed by applying a pressure to one side e.g. the internal side of the apparatus, following which measurement of the pressure drop will indicate a leak in the surfaces between the product and service sides.

This technology is vitiated by the general weakness that it presupposes that the internal part of the apparatus has to be sealed tightly, and a measurable pressure drop within a reasonable measuring period requires a considerable leak between the internal and external side.

Conductivity measurement for leak control is based on the principle that if an electrolyte is added to e.g. the internal side of a water-filled apparatus, transfer of this electrolyte via leaks in the surfaces will result in an increase in the conductivity in the liquid present on the external side of the apparatus. Leak determination of this type is normally performed by operating pressure on the electrolyte side and circulating an amount of water across a conductivity meter on the other side.

A serious drawback of this method of leak determination is that it requires a considerable electrolyte transfer before a significant measurement of conductivity can be achieved. By way of example it may be mentioned that it requires a transferred amount of a 6 w/V % $Na_2SO_4$ solution of about 20 ml per 100 liters of circulating recipient water in which the conductivity is measured, to achieve a significant measurable change in conductivity of the order of 10 µS, which is the value used by Bactoforce as a lower limit of leak determination.

The gas detection method which is described in U.S. Pat. No. 4,688,627 is based on the principle that a pressurized gas (e.g. helium) is applied to one side of an apparatus, following which the occurrence of this gas is measured by a gas detector on the other side.

This method is vitiated by the basic drawback that the apparatus must be completely drained and entirely dry, which is impossible to achieve in practice.

A large number of other methods based on the specific mass transfer method rely on the simple principle that a specific measurable substance is applied to the internal side or the external side, while a clear liquid is applied to the other side, said clear liquid being recirculated so that the presence of leaks in the apparatus is observed by detecting the presence of the specific substance in the clear liquid as described in inter alia U.S. Pat. No. 5,759,857; U.S. Pat. No. 5,170,840; EP No. 0 597 659 A2; U.S. Pat. No. 4,328,700; and U.S. Pat. No. 3,790,345.

It is common to all mass transfer methods that they are vitiated by the basic problem that detection of leaks requires a considerable mass transfer, and that the sensitivity is inversely proportional to the size of the apparatus.

The technology currently known and used for the control of leaks in an apparatus between the internal and the external side with a view of controlling leaky elements is not useful for in situ leak control—independently of the selected technique or combination of known techniques.

In addition, the technologies are associated with very serious drawbacks and costs which make them unuseful in general.

The most serious drawback of the known technology for leak determination and localisation of leaks in process apparatuses is that the sensitivity of the measuring methods used for leak control is inversely proportional to the size of the apparatuses.

Examples of other serious drawbacks are that the technology is deficient or not suitable with respect to achieve a leak control which is reliable and complete under operational conditions, that the technology is not sufficiently sensitive to demonstrate small leaks in process apparatuses, and that the technology is very costly and time-consuming.

Thus, there is great need for new technologies by means of which it may be ensured quickly, uniformly and in a completely reproducible manner in situ and with exact limitations of operating conditions that the apparatus operate optimally, in that the surface between the internal and the external side of the apparatus is completely tight without any risk of transfer and cross-contamination of the liquid substances which are treated in the apparatus.

To be able to measure and document the purity of the product side in apparatuses and process systems which are cleaned by CIP ("cleaning-in-place") cleaning, the effectiveness of the cleaning performed, and the ease of cleaning of the individual parts of the apparatus, a large number of methods have been developed which are within the fields of gravimetrical, physico-chemical, microbiological and physical methods (Fat. Sci. Technol., December 1989, p. 621-624).

It is moreover known from Danish patent No. 155 627 to detect contamination in closed process systems by measuring the conductivity of the cleaning liquid.

It is common to all these methods that none of the methods alone give any qualified picture of the purity of the total production surfaces in a closed process system in terms of a distinct evaluation of the risk of contamination o the next production.

For the control of the purity of tableware (saucers, cups, etc.) with respect to residues and coatings of protein and starch, Nordic Food Products Methology Committee (no. 4, vol. 2, 1962) has described a chemical examination method which, by means of a chemical reaction between protein and starch and fuchsin and iodide/potassium iodide, respectively, is capable of showing and thereby visually the presence of protein and starch, respectively, on tableware (saucers, cups, etc.).

The principle of this method—to demonstrate the presence of organic residues on surfaces by a chemical reaction between the organic residues and a specific chemical tracer, following which the reduction of the tracer added to the circulating flushing water is measured—is described as a qualitative and quantitative method for purity control of closed process systems in Danish Published Application No. 0992/92.

This method is vitiated by the quite general weakness that the water volume necessary for circulation in a closed process system is generally very large compared to the degree of contamination of the internal surfaces of the system, so that a measurable change in the concentration of an added tracer to this water volume either requires a considerable chemical reaction between tracer and contaminant or a measuring device capable of recording even very small changes in concentration. This means that either the measuring period, during which the chemical reaction proceeds, must be very considerable, or that the measuring device used must be extremely sensitive. This means in both cases that the use of the method is very limited, and that the method is not suitable for on-line/in-line systems. Finally, this form of methods for purity control of closed process systems means that there is an undesirable relation between sensitivity and amount of water.

The technology currently known and available for purity control of the internal surfaces of closed process systems with a view to controlling and optimising the hygiene—independently of the selected technique or combination of known techniques—is not suitable for in situ purity control of process apparatuses with such a great and size-independent sensitivity as is required. Moreover, the technologies involve very considerable drawbacks and costs which cause them to be unuseful in general.

Thus, there is a great need for new technologies which can ensure quick, uniform purity control and in a completely reproducible manner in situ and with exact limitations of operating conditions wherein the process apparatus operates optimally when the internal surfaces or process surface are totally pure, so that a product contacting the surfaces is not contaminated by contaminants from the preceding production.

SUMMARY OF THE INVENTION

The foregoing needs are met, to a great extent, by the present invention, wherein one embodiment provides methods allowing for determining the cleanness of an apparatus and for detecting a leakage in an apparatus.

In accordance with one embodiment of the present invention, a method of determining the cleanness of an apparatus is provided, which can include treating the interior of the apparatus with a permanganate solution, so as to cause the permanganate to react with contaminants, if any, present within the apparatus, rinsing the interior of the apparatus to remove non-reacted permanganate, contacting the interior of the apparatus with a peroxide solution, and detecting a splitting, if any, of the peroxide into oxygen and water.

In accordance with another embodiment of the present invention, a method of detecting a leakage in an apparatus is provided, which can include filling the interior of the apparatus with a liquid, the liquid being a catalyst solution for catalyzing a splitting of a peroxide into oxygen and water, establishing an elevated pressure within the apparatus, contacting the exterior of the apparatus with a peroxide solution, inspecting the exterior of the apparatus to detect leakage, if any, where the leakage may be indicated by the splitting of peroxide into oxygen and water.

In accordance with yet another embodiment of the present invention, a method of detecting a leakage in an apparatus is provided, which can include filling the interior of the apparatus with a liquid, the liquid being a peroxide solution, establishing an elevated pressure within the apparatus, contacting the exterior of the apparatus with a catalyst solution for catalyzing a splitting of a peroxide into oxygen and water, inspecting the exterior of the apparatus to detect leakage, if any, where the leakage may be indicated by the splitting of peroxide into oxygen and water.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
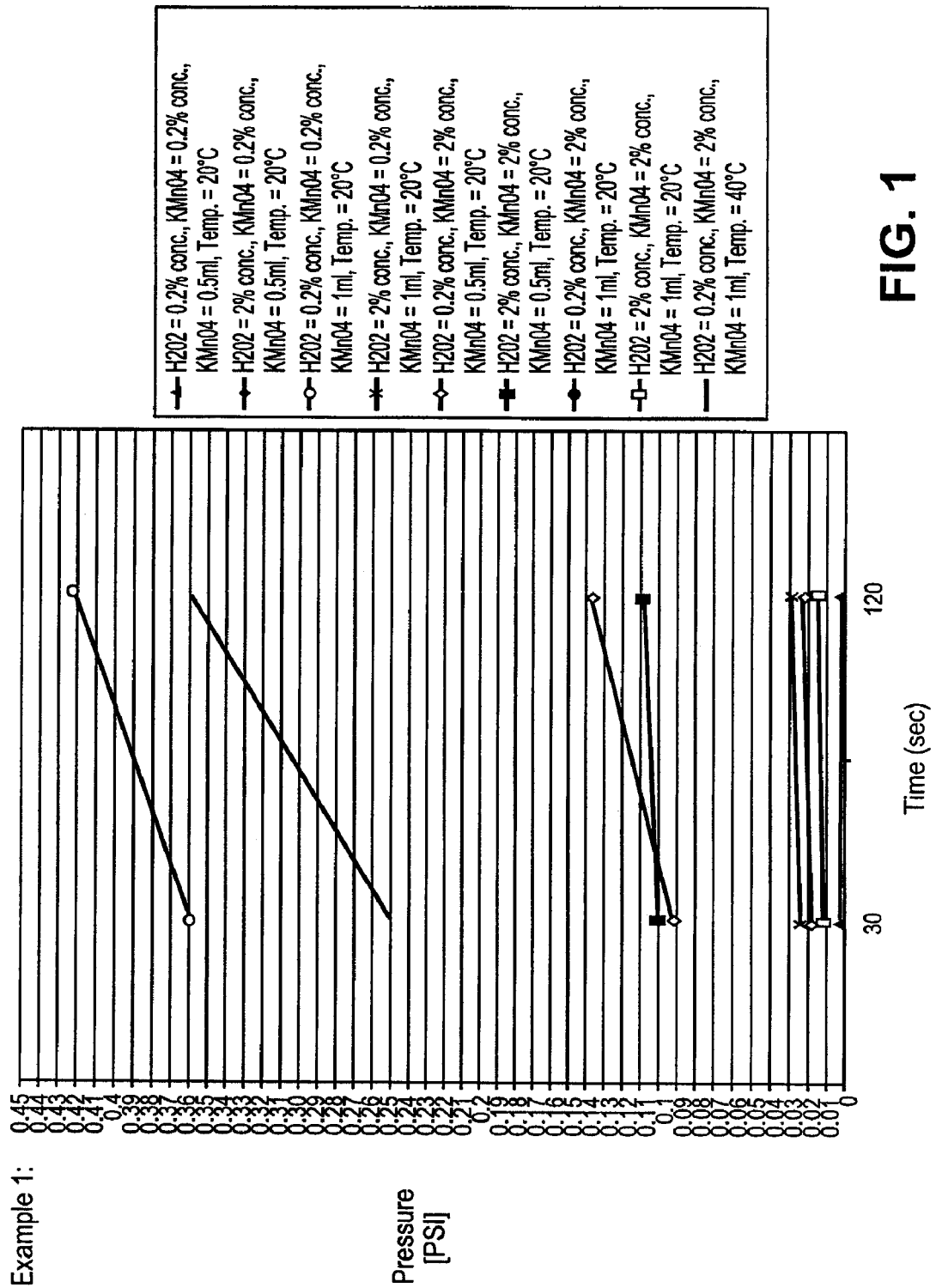
FIG. 1 shows a simulation test of the crack test.

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Therefore, specific structural and functional details disclosed herein are not to be interpreted as limiting, but merely as a representative basis for teaching one skilled in the art to variously employ the present invention.

The primary object of the present invention is to provide a method of determining the cleanness of an apparatus and to provide a use of said method for determining the cleanness of an apparatus. Moreover it is an object of the present invention to provide a method of determining the cleanness of an apparatus which is exposed to liquids containing organic material. The liquid may have various compositions and viscosities, e.g. the liquids may be milk, forcemeat or heavy oils.

It is further an object of the present invention to provide a method of determining the cleanness of an apparatus which can be done in situ, and which is fast and reliable.

The method requires in a particular version that the part of the process apparatus to be controlled is free of leaks, thus a further secondary object of the method according to the invention is to provide a method of detecting a leakage in an apparatus and to provide a use of said method for detecting a leakage in an apparatus.

These objects and other objects are achieved by the invention as defined in the claims.

By the method according to the invention a simple, quick, cheap and reliable technology is provided, and according to which it is possible to determine the cleanness of an apparatus and to detect a leakage in an apparatus.

In addition, the method according to the invention has the advantages that the method is cost-effective, non-toxic and non-hazardeous. The method according to the invention is independent of the size and the enclosed volume of the process apparatus. Moreover the method is easy to perform in situ on an apparatus in a process line, as the method is uncomplicated and requires only a minor amount of equipment on the apparatus.

In a first aspect the present invention relates to a method of determining the cleanness of an apparatus comprising the steps of:
i) treating the interior of the apparatus with a solution comprising permanganate, so as to cause the permanganate to react with contaminants, if any, being present within the apparatus,
ii) rinsing the interior of the apparatus to remove non-reacted permanganate,
iii) contacting the interior of the apparatus with a solution comprising peroxide,
iv) detecting a splitting, if any, of peroxide into oxygen and water.

According to the method in step i) the interior of the apparatus is treated with a solution comprising permanganate. The treatment consists in a reaction between the permanganate and contaminants, if any, being present within the apparatus. By treating is meant that the permanganate is brought into close contact with the interior of the apparatus. By said treatment the permanganates react and dissolve the contaminants.

In principle, the solution is poured onto the interior of the apparatus to be subjected to determination of cleanness, by which the solution is brought into contact with the interior of the apparatus. When the solution is in close contact with the interior of the apparatus, the permanganate will react preferably oxidatively with contaminants, if any, being present within the apparatus, by which the permanganate will be converted or decomposed as function of the amount of contaminants.

After treating the interior of the apparatus with a solution comprising permanganate, the interior of the apparatus is rinsed in order to remove non-reacted permanganate. The interior of the apparatus is hereafter contacted with a solution comprising peroxide which reacts with contaminants, if any, and is splitted into oxygen and water. Hereafter a splitting, if any, of peroxide into oxygen and water is detected.

The detection of a splitting of peroxide into oxygen and water is an expression of the degree of contamination of the interior of the apparatus being subjected to cleanness control. If there is no detecting of peroxide into oxygen and water, this implies that the interior of the apparatus is free of contaminants. If the interior of the apparatus is not free of contaminants the steps i) to iv) may be repeated one or more times in order to confirm the result.

The apparatus may preferably be a heat exchanger, pump, valve, pipeline, tank or homogenizer.

In a preferred embodiment the method further comprises a step of rinsing the interior of the apparatus with a liquid, where there is a detection of a splitting of peroxide into oxygen and water, and then repeating the steps i) to iv). The liquid is preferably water, more preferably purified water. The liquid may also preferably be a solvent, preferably comprising a reactive component which reacts with and dissolves contaminants in the apparatus. The step of rinsing the surface with a liquid is useful in order to remove the contaminants.

In another embodiment it is preferred that the solution is water. Hereby the method uses a cheap, readily available and environmentally friendly solution. Moreover it is cost-effective to use water. Conventional tap water can be used according to the method. Furthermore, the solution can hereby also act as rinsing water in the cleaning process.

Incidentally, establishment of the connection between degree of contamination and detection of a splitting of peroxide into oxygen and water can be done by experiments that are routine to the skilled person.

In a preferred embodiment the permanganate is potassium permanganate or sodium permanganate. The potassium permanganate, $KMnO_4$, or sodium permanganate, $NaMnO_4$, reacts with hydrogen peroxide under formation of oxygen, manganese dioxide, and heat, and furthermore reacts with organic material under formation of manganese dioxide. In aqueous solution, potassium permanganate has a strong red colour, and the red colour will fade if potassium manganese reacts with contaminants. The contaminant is revealed by a colour shift in the solution which can either be established visually or by known optical methods.

The invention is based on the surprising finding that both contaminations and leaks can be detected by exposing the apparatus to peroxides, said peroxides being splitted into oxygen. The peroxide is preferably hydrogen peroxide.

According to the invention leaks and contaminations can be detected by measuring the production of oxygen, other physical and chemical parameters affected by the production of oxygen, heat and/or sound following the process.

According to the method a development of oxygen, heat and sound appears due to the splitting of peroxide into oxygen and water caused by leaks or contamination. In one embodiment the splitting of peroxide into oxygen and water is detected by detecting oxygen by use of a detecting means which detects the presence of oxygen. The oxygen is preferably detected by pressure change or detected by the presence of oxygen. The amount of oxygen is detected by increasing the volume, total pressure, specific oxygen partial pressure or dissolved oxygen. By way of example only, the peroxide used in this method is hydrogen peroxide or acetyl hydroperoxide, also known as peracetic acid. It will be readily recognized that the reaction being exothermic, temperature will rise and secondary effects such as water vapour generation may also occur and be accounted for, In a second embodiment the splitting of peroxide into oxygen and water is detected by a temperature increase preferably by measuring the temperature increase. In a third embodiment the splitting of peroxide into oxygen and water is detected by sound, preferably detected by an acoustic receiver.

In a second aspect the present invention relates to a method of detecting a leakage in an apparatus comprising the steps of:
i) filling the interior of the apparatus with a liquid,
ii) establishing an elevated pressure within the apparatus,
iii) inspecting the exterior of the apparatus to detect leakage, if any, which method is characterized by
iv) contacting the exterior of the apparatus with a solution comprising peroxide,
v) said apparatus being filled with a solution of a catalyst catalyzing a splitting of a peroxide into oxygen and water, and
vi) said inspection serving to detect a splitting, if any, of peroxide into oxygen and water.

According to the method the exterior of the apparatus is contacted with a solution comprising peroxide. By contacting is meant that the peroxide is brought into close contact with the exterior of the apparatus. After contacting the exterior of the apparatus with a solution comprising peroxide, the apparatus is filled with a solution of a catalyst catalyzing a splitting of a peroxide into oxygen and water. Hereafter a splitting, if any, of peroxide into oxygen and water is detected. It should be explained that the apparatus is usually made of alloys which does not readily react with the catalyst or the peroxide, e.g. stainless steel.

The detection of a splitting of peroxide into oxygen and water is an expression of a leakage in the apparatus. If there is no detection of peroxide in oxygen and water, this implies that the apparatus is free of leakage. If the apparatus is not free of leakage, the steps may be repeated one or more times in order to confirm the result.

In a third aspect the present invention relates to a method of detecting a leakage in an apparatus comprising the steps of:
i) filling the interior of the apparatus with a liquid,
ii) establishing an elevated pressure within the apparatus,
iii) inspecting the exterior of the apparatus to detect leakage, if any, which method is characterized by
iv) contacting the exterior of the apparatus with a solution of a catalyst catalyzing a splitting of a peroxide into oxygen and water,
v) said apparatus being filled with a solution comprising peroxide,
vi) said inspection serving to detect a reaction between peroxide and catalyst on the exterior of the apparatus.

According to the method the exterior of the apparatus is contacted with a solution of a catalyst catalyzing a splitting of a peroxide into oxygen and water. By contacting is meant that the solution is brought into close contact with the exterior of the apparatus. After contacting the exterior of the apparatus with a solution of a catalyst catalyzing a splitting of a peroxide into oxygen and water, the apparatus is filled with a solution comprising peroxide. Hereafter a reaction between peroxide and catalyst on the exterior of the apparatus is detected.

The detection of a reaction between peroxide and catalyst on the exterior of the apparatus is an expression of a leakage in the apparatus. If there is no detection of a reaction between peroxide and catalyst, this implies that the apparatus is free of leakage. If the apparatus is not free of leakage, the steps may be repeated one or more times in order to confirm the result.

The apparatus many preferably be a heat exchanger, pump, valve, pipeline, tank or homogenizer.

The catalyst may preferably be permanganates and more preferably potassium permanganate or sodium permanganate. Although permanganates are preferred in the method, due to their formation to manganese dioxide, other catalysts for splitting hydrogen peroxide can be used according to the invention. The alternative components which can replace the catalytic action of manganese dioxide are various dissolved ions of in particular heavy metals such as iron, copper, manganese, nickel and chrom and certain enzymes (e.g. katalase).

In a preferred embodiment the method further comprises a step of replacing the part where there is a detection of a splitting of peroxide into oxygen and water or a detection of a reaction between peroxide and catalyst, with a new leak-free part, and then repeating the steps according to the method.

In one embodiment the method further comprises a step of sealing off and pressurizing the apparatus.

The invention is based on the surprising finding that leaks can be detected by use of peroxides which can split off oxygen when reacting with a catalyst in an exothermic reaction. According to the invention leaks can be detected by measuring the production of oxygen, other physical and chemical parameters affected by the production of oxygen, heat and/or sound following the process. The peroxide is preferably hydrogen peroxide.

According to the method a development of oxygen, heat and sound appears due to the splitting of peroxide into oxygen and water or due to the reaction between peroxide and the catalyst caused by leaks.

In one embodiment the splitting of peroxide into oxygen and water is detected by detecting oxygen by use of a detecting means which detects the presence of oxygen. The oxygen is preferably detected by pressure change or detected by the presence of oxygen. The amount of oxygen is detected by increasing the volume, total pressure, specific oxygen partial pressure or dissolved oxygen. In a second embodiment the splitting of peroxide into oxygen and water is detected by a temperature increase preferably by measuring the temperature increase. In a third embodiment the splitting of peroxide into oxygen and water is detected by sound, preferably detected by an acoustic receiver.

In another embodiment the reaction between peroxide and catalyst is detected by visually determining the reaction.

The invention further relates to the use of a method according to the claims for determining the cleanness of an apparatus and for detecting a leakage in an apparatus.

The invention will now be described in further details with reference to the examples and drawings in which:

FIG. 1 shows a simulation test of the crack test.

Figure 2:
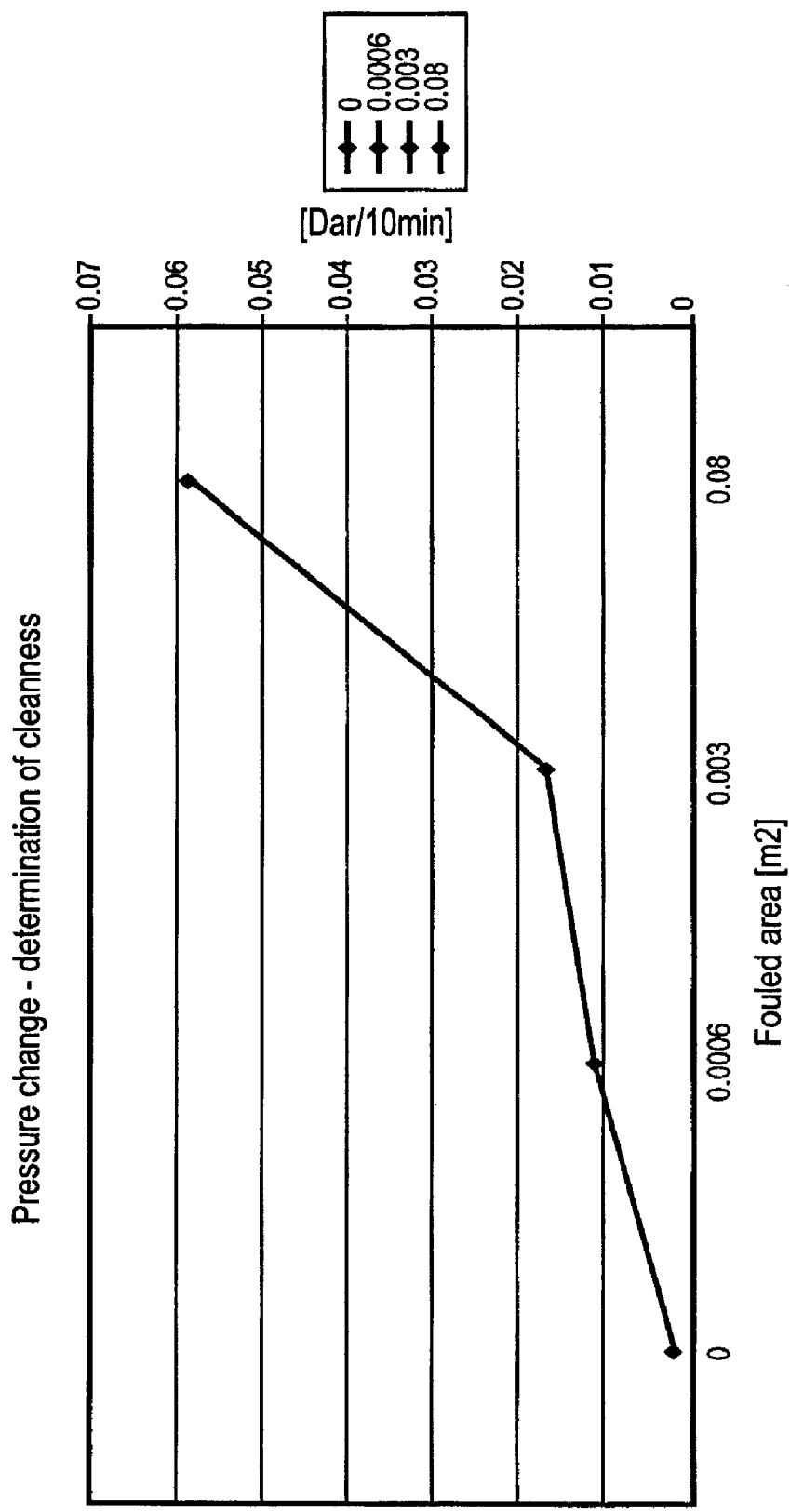
FIG. 2 shows the change of pressure due to contamination.

FIG. 2 shows the change of pressure due to contamination.

FIG. 1 illustrates the pressure increase by mixing solutions of hydrogen peroxide with solutions of potassium permanganate in different concentrations and at different temperatures. It will be readily observed that at low catalyst concentrations, e.g. 0.2%, the pressure change was not readily detectable. However, with all instances of sufficient catalyst strength, e.g. 2% in FIG. 1, a detectable pressure change was recordable, with both 0.2 and 2% peroxide solutions. This feature has been employed in this invention to detect cracks. The size of the crack which can be detected in this way is small but not precisely defined. Some of the cracks to be detected are only a few microns or few tens of microns in equivalent diameter.

FIG. 2 illustrates the relation between organic fouled area and the pressure change after exposure to potassium permanganate and hydrogen peroxide.

Example 2

Test object: A plate heat exchanger with T4-plates (ice, heat, regenerative) coupled as a circulatory system with pump and balance tank, including digital nanometer and shut-off taps, so as to allow the exchanger to be manually sealed off for measurement of pressure changes.

| System data: | |
|---|---|
| Water volume | approx. 35 liters |
| Temperature trials | 22° C. |
| Temperature purifying | 22° C. |
| Flow rate | — |
| Throughflow time | — |
| Plates | 19 cooling section, 19 heating section, 27 regenerative |
| Single plate area | 0.04 m² |

Prior to the present trials, the apparatus which had not previously been used in any production was purified with an approx. 2% lye solution (product name—Monoclean Plus). Hereafter, the degree of apparatus fouling prior to trial was 0.

Trials:

A. The clean system was circulated with pure water to which $H_2O_2$ was added to a 2% solution, whereafter the heat exchanger was sealed off, pressure changes being read each 5 minute for 25 minutes.

B. The clean system was opened and a pair of plates was removed and replaced by a pair of plates having been fouled in advance in the following way:

the plates were applied (by brush) with a coat of egg white on one side of each plate, whereafter the egg white was burned onto the plates by retention for approx. 15 minutes in furnace at approx. 150° C. Hereafter the cooled plates were dipped into a 0.1% solution of $KMnO_4$ for approx. 5 minutes, whereafter they were rinsed thoroughly with pure water for removal of all residues of $KMnO_4$.

The system was circulated with pure water, to which $H_2O_2$ was added to a 2% solution, whereafter the heat exchanger was sealed off, pressure changes being read each minute for 10 minutes.

The fouled area equals 0.08 m².

C. The system was circulated briefly (max. 30 seconds) with the solution of 2% $H_2O_2$, whereafter the heat exchanger was sealed off, pressure changes being read each minute for 10 minutes.

D. The system was circulated for approx. 2 minutes with a 6% solution of $H_2O_2$, whereafter the heat exchanger was sealed off, pressure changes being read each minute for 10 minutes.

E. The system was drained and rinsed with pure water, whereafter it was opened, and the fouled pair of plates was removed and replaced by a clean pair of plates, on one plate of which a fouling of 5×5 cm had been made, applied as in 2.

Hereafter, the system was circulated with pure water, to which $H_2O_2$ was added to a 2% solution, whereafter the heat exchanger was sealed off, pressure changes being read each minute for 10 minutes.

The fouled area equals about 0.008 m², which corresponds to 3% of the fouled area in trials B, C and D.

F. The system was circulated for approx. 2 minutes with a 6% solution of $H_2O_2$, whereafter the heat exchanger was sealed off, pressure changes being read each minute for 10 minutes.

G. The system was drained and rinsed with pure water, followed by circulation for 35 minutes with a 2% solution of leaching solution. The system was rinsed with pure water, followed by circulation for approx. 2 minutes with a 2% solution of $H_2O_2$, following which the heat exchanger was sealed off, pressure changes being read each minute for 10 minutes.

H. The system was opened, and residues of visible contamination on fouled plate pairs (5×5 cm) were removed by manual cleaning, whereafter the cleaned plates were fitted again, and the system was circulated for approx. 2 minutes with a 2% solution of $H_2O_2$, following which the heat exchanger was sealed off, pressure changes being read each minute for 10 minutes.

Results:

The connection between pressure change/10 minutes (bar) and fouled area (m²) is set forth in FIG. 2.

The results obtained show that:

organic contamination in a closed system can be made visible by measuring the pressure caused by the catalytic cleavage of hydrogen peroxide ($H_2O_2$) caused by manganese dioxide ($MnO_2$), the system is first circulated with a potassium manganate solution ($KMnO_4$), which reacts with organic contamination under formation of manganese dioxide ($MnO_2$) and then (following rinsing with pure water) filled with a hydrogen peroxide solution ($H_2O_2$).

the measured pressure increase is proportional to the amount of organic contamination in the system.

the measured pressure increase is dependent on the concentration of hydrogen peroxide, potassium manganate, exposure and measuring time and the temperature (result from earlier trials May 3, 2001).

the measured pressure increase is independent of the size and enclosed volume of the closed system provided the system can be considered a "rigid" structure.

the sensitivity of the present method for purity control is so high that it will be possible to detect contamination occurrences of the order of 1 cm².

A demonstrative example of the process of implementing one of the embodied methods for detecting a leakage of an apparatus is detailed below.

A solution of potassium permanganate is recirculated under pressure in a closed loop on one side of a plate heat exchanger. The other side of the plate heat exchanger is filled with a solution of hydrogen peroxide or another chemical that produces free oxygen in the presence of potassium permanganate and the circuit is sealed.

In the event that there is a crack in one of the heat exchanger plates, then the potassium permanganate will pass through the plate and come into contact with the hydrogen peroxide. When this happens, the permanganate catalyses the degradation of the hydrogen peroxide to water and oxygen.

The production of oxygen can be measured using a pressure gauge and/or the use of a dissolved oxygen meter.

Whilst a stainless steel heat exchanger can contain substances that also catalyses the degradation of hydrogen peroxide the rate of the reaction has in practice been found to be extremely low and a pre-test can be conducted in the absence of potassium permanganate on the other side of the heat exchanger to determine this low level of reaction.

In using this technology the rate of degradation will increase substantially with time as the potassium permanganate continues to penetrate the crack. This means that the time needed to detect a small crack is greatly reduced compared to the use of an electrically conducting salt solution where a long time may be necessary before sufficient salt solution penetrates the crack to be detected by an electrical conductivity meter.

The invention claimed is:

1. A method of detecting a leakage in an apparatus comprising the steps of:
   i) filling said apparatus with a solution of a catalyst catalyzing a decomposition of a peroxide into oxygen and water,
   ii) sealing the apparatus and establishing an elevated pressure within the apparatus,
   iii) contacting the exterior of the apparatus with a solution comprising peroxide,
   iv) inspecting the exterior of the apparatus to detect leakage, if any, and
   v) detecting, whether a decomposition of peroxide into oxygen and water occurs on the exterior of the apparatus, wherein detecting such decomposition is an evidence of the leakage.

2. A method according to claim 1, wherein the steps are repeated one or more times.

3. A method according to claim 1, wherein said method further comprises a step of replacing the part, where there is a detection of a decomposition of peroxide into oxygen and water or a detection of a reaction between peroxide and catalyst, with a new leak-free part.

4. A method according to claim 1, wherein said liquid comprises permanganates.

5. A method according to claim 4, wherein the permanganates are potassium permanganate or sodium permanganate.

6. A method according to claim 1, wherein the peroxides are hydrogen peroxide.

7. A method according to claim 1, wherein the catalyst is permanganates.

8. A method according to claim 1, wherein the catalyst is dissolved ions of heavy metals such as iron, copper, manganese, nickel and chrom and certain enzymes, e.g. catalase.

9. A method according to claim 1, wherein the decomposition of peroxide into oxygen and water or the reaction between peroxide and the catalyst is detected by detecting oxygen.

10. A method according to claim 9, wherein oxygen is detected by pressure change.

11. A method according to claim 1, wherein the decomposition of peroxide into oxygen and water is detected by measuring a temperature increase.

12. A method according to claim 1, wherein the decomposition of peroxide into oxygen and water is detected by sound, preferably detected by an acoustic receiver.

13. A method according to claim 1, wherein the reaction between peroxide and catalyst is detected by visually determining the reaction.

14. A method according to claim 1, wherein the apparatus is a heat exchanger, pump, valve, pipeline, tank or homogenizer.

* * * * *